United States Patent
Sharda et al.

(10) Patent No.: US 9,715,268 B2
(45) Date of Patent: Jul. 25, 2017

(54) REDUCING POWER BY VACATING SUBSETS OF CPUS AND MEMORY

(71) Applicant: Microsoft Technology Licensing, LLC, Redmond, WA (US)

(72) Inventors: Vishal Sharda, Redmond, WA (US); Bruce Lee Worthington, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 14/707,881

(22) Filed: May 8, 2015

(65) Prior Publication Data

US 2016/0328001 A1 Nov. 10, 2016

(51) Int. Cl.
G06G 1/00 (2006.01)
G06F 1/32 (2006.01)
G06F 9/50 (2006.01)

(52) U.S. Cl.
CPC .............. *G06F 1/3234* (2013.01); *G06F 1/32* (2013.01); *G06F 9/5011* (2013.01)

(58) Field of Classification Search
CPC ......... G06F 1/3234; G06F 9/5011; G06F 1/32
USPC ............ 713/320, 323; 711/5, 133, 165, 207; 718/1
See application file for complete search history.

(56) References Cited

U.S. PATENT DOCUMENTS

| | | | |
|---|---|---|---|
| 2005/0060590 A1 | 3/2005 | Bradley et al. | |
| 2008/0034234 A1* | 2/2008 | Shimizu | G06F 1/3225 713/320 |
| 2008/0320203 A1* | 12/2008 | Fitzgerald | G06F 1/3225 711/5 |
| 2011/0154104 A1* | 6/2011 | Swanson | G06F 11/1666 714/6.23 |
| 2011/0252210 A1* | 10/2011 | Davies | G06F 3/0605 711/165 |
| 2011/0271070 A1* | 11/2011 | Worthington | G06F 12/1009 711/165 |
| 2012/0011508 A1* | 1/2012 | Ahmad | G06F 12/1009 718/1 |
| 2012/0023144 A1* | 1/2012 | Rub | G06F 12/0246 707/813 |

(Continued)

OTHER PUBLICATIONS

"International Search Report & Written Opinion issued in PCT Application No. PCT/US2016/027648", Mailed Date: Jul. 6, 2016, 12 pages.

(Continued)

*Primary Examiner* — Aurel Prifti
(74) *Attorney, Agent, or Firm* — Workman Nydegger (57) ABSTRACT

A system has one or more primary power regions having restrictions indicating that the primary power regions are not to be placed in an offline state. The system also includes one or more secondary power region that can either be parked or off-lined into a limited state having limited functionality in that functionality is removed from the one or more secondary power regions when placed in a limited state. At least one interrupt is allocated to one of the primary power regions, based on interrupt characteristics. At least one thread is allocated to one of the primary power regions, based on thread characteristics. At least one page is allocated to one of the primary power regions, based on page characteristics.

20 Claims, 4 Drawing Sheets

(56) References Cited

U.S. PATENT DOCUMENTS

| | | | |
|---|---|---|---|
| 2012/0079232 A1* | 3/2012 | Hinton | G06F 12/0292 |
| | | | 711/207 |
| 2012/0144144 A1* | 6/2012 | Worthington | G06F 12/0223 |
| | | | 711/165 |
| 2013/0073886 A1* | 3/2013 | Zaarur | G06F 12/023 |
| | | | 713/320 |
| 2015/0363326 A1* | 12/2015 | Baskakov | G06F 12/1009 |
| | | | 711/133 |

OTHER PUBLICATIONS

Corbet, J., "How Much Memory Power Management is Useful?," LWN.net, Available at https://lwn.net/Articles/568891/ Retrieved May 2, 2014, Available as early as Oct. 2, 2013, 3 pages.

"International Preliminary Report on Patentability Issued in PCT Application No. PCT/US2016/027648", Mailed Date: Mar. 29, 2017, 8 Pages.

\* cited by examiner

REDUCING POWER BY VACATING SUBSETS OF CPUS AND MEMORY

BACKGROUND

Background and Relevant Art

Computers and computing systems have affected nearly every aspect of modern living. Computers are generally involved in work, recreation, healthcare, transportation, entertainment, household management, etc. Large data centers can store large amounts of data and provide computing resources to clients located remotely from the data centers. However, growing concerns about the expense of powering and cooling data centers and other server computer environments, as well as the increasing consciousness about conserving natural resources, is pushing the computing hardware and software industries to find innovative ways to reduce computer energy consumption.

While it is possible for hardware manufacturers, including manufacturers of CPU and memory components, to design features into their hardware that will independently improve energy efficiency (e.g., dropping individual CPU cores or memory or entire processor packages dynamically into lower power states when they are not in use), there is a limit to what the hardware can do on its own. Software can similarly attempt to reduce energy consumption without any knowledge of the architecture or implementation details of the underlying hardware, but it too will be limited in its success.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a system having one or more primary power regions having restrictions indicating that the primary power regions are not to be placed in an offline state. The system also includes one or more secondary power region that can either be parked or off-lined into a limited state having limited functionality in that functionality is removed from the one or more secondary power regions when placed in a limited state. At least one interrupt is allocated to one of the primary power regions, based on interrupt characteristics. At least one thread is allocated to one of the primary power regions, based on thread characteristics. At least one memory page is allocated to one of the primary power regions, based on page characteristics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Traditionally, operating systems distribute objects such as processes, threads (where a thread is an elemental sequence of instructions) and memory contents across different packages to improve performance of the system (e.g., load-balancing). A package generally includes a collection of hardware generally implemented on a single semiconductor die or packaged together in a single chip. In some cases, a multi-chip module may be used in a package. However, if the hardware provides the capability of shutting down an entire package (or dropping it into a deep low-power or no-power state based on workload demand and other criterion), the operating system would first need to vacate the memory associated with a package or its contents may be lost. It may also need to move affinitized interrupts, processes, and threads off that package. It could then signal the hardware to reduce power to or shut down one or more packages and thereby save significant amounts of energy.

Embodiments described herein can improve computer energy efficiency by implementing computing systems that move the software resources (e.g., processes, threads, interrupts, and/or memory pages) away from a subset of hardware components (e.g., cores, packages, boards, DIMMs, channels, nodes, etc.) and consolidate those onto the remaining subset of hardware components to enable the former subset to drop into a low-power or no-power state.

Embodiments use memory topology and processor topology information, combined with memory access patterns detected in software, to guide an operating system (OS) or application software algorithm to optimize the amount of energy consumed by a computer. When policy is such that energy saving is desired or when the workload is light enough that the entirety of processors and memory is not needed or accessed at the same time, the OS or application relocates processes, threads, interrupts, and/or memory contents to enable processor packages (or other power-independent subsets of CPUs and memory) containing memory and processors to enter a lower-power or no-power state depending on the success of the relocation process. When policy is such that performance is more important than energy savings or when the workload is heavy enough to need more processors and/or more memory, active processes, threads, interrupts, and/or memory can be spread across a wider range of packages or power regions to increase throughput and decrease latency, understanding that total energy consumption may increase as a result.

Thus, some embodiments relocate compute, memory, or other resources to vacate a power region and place it in a limited state, such as a low-power or no-power state. Some embodiments relocate compute, memory, or other resources to a previously-vacated power region that is now active and available for use. Some embodiments assign static resources to UNMOVABLE power regions and dynamic resources to MOVABLE or UMOVABLE power regions. Some embodiments classify combined CPU and memory power regions (e.g., processor packages with memory attached) as MOVABLE or UNMOVABLE. Some embodiments perform partial parking or offlining (e.g. only CPUs or memory parking or offlining from a processor package).

Figure 1:
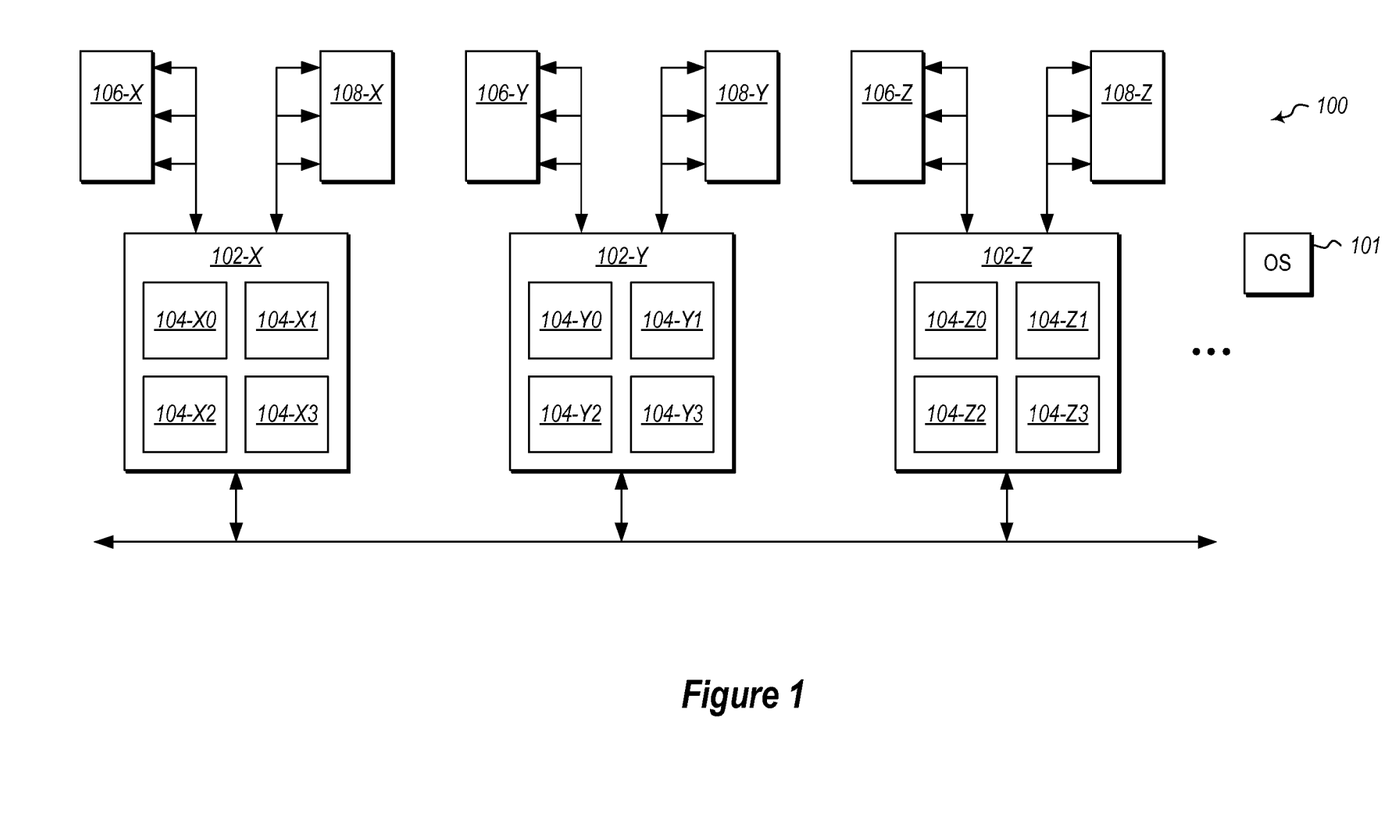
FIG. 1 illustrates an example system with power regions based on packages.
Figure 2:
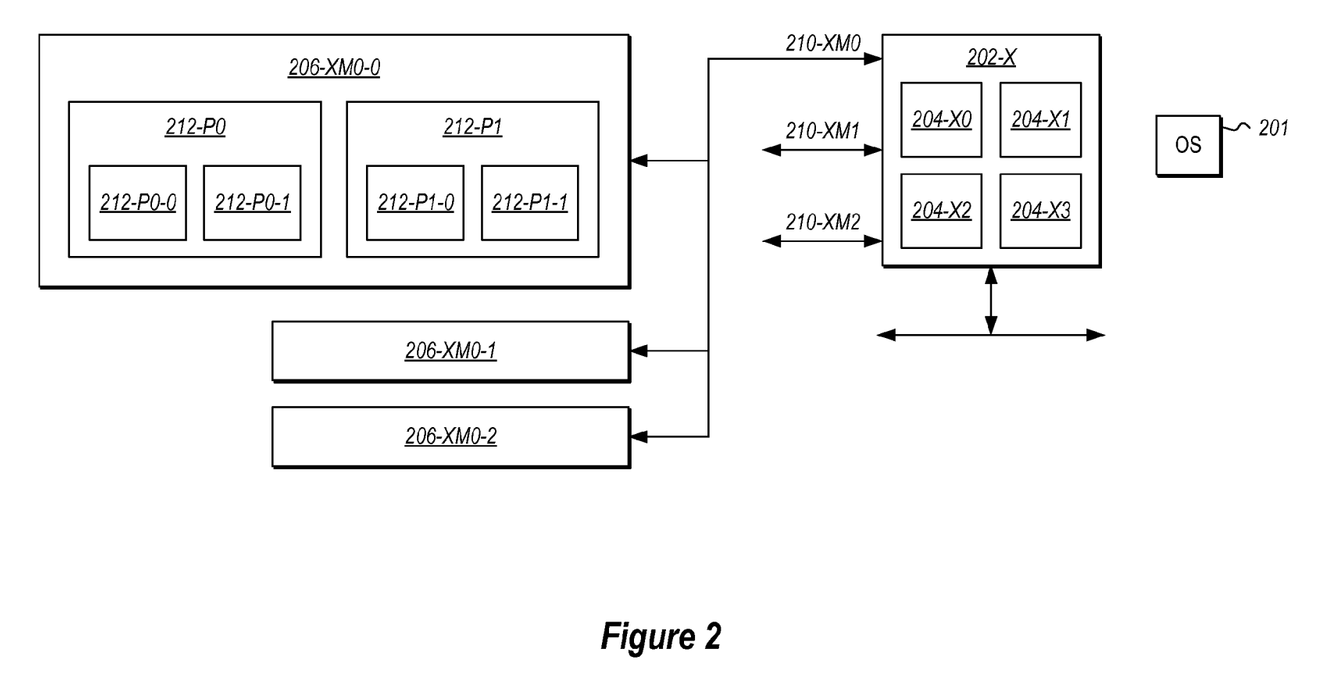
FIG. 2 illustrates an example system with power regions based on defined power regions in memory units.

For purposes of discussion, the power regions/groupings used as examples below are implemented as "packages" of CPUs and associated memory (e.g., channels, DIMMs, banks, ranks, etc.) as illustrated in FIG. 1. However, this is not a restriction on the implementations of the invention. Rather, FIG. 2 illustrates examples where power regions may be implemented within a package.

The following disclosure illustrates how power region "parking" (low-power scenarios) or "offlining" (no-power scenarios) resource allocation and relocation algorithms can be implemented and tuned (statically or dynamically) depending on various workload and policy conditions. Note that while packages are generally illustrated, the concepts can be applied to virtually any power region delineation.

TERMINOLOGY

It is useful to introduce some basic terminology to make the descriptions of the algorithms easier. Thus, various terms used herein are now defined.

A "page" is a basic unit of memory that is managed by the OS memory manager. A physical page has a fixed physical address, but it can have multiple virtual addresses (e.g., for accesses from different OS processes) mapped to a single physical page. In most cases, when a "page" is referred to in this disclosure, what is really being referred to is the contents of that page. When pages are classified by their access patterns, they are described in a thermographic model, using "heat" as the measure of access activity. A physical memory page, based on its contents and access patterns, can be categorized as follows:

Free: the physical page can be overwritten/repurposed at any time (i.e., it is available to be allocated for any purpose). It won't be accessed until it is initialized and/or allocated by the memory manager. All other types of physical pages are deemed "active" and have (presumably useful) content in them.

HOT: the page is known or expected to be accessed frequently.

COLD: the page is known or expected to be accessed infrequently.

Standby: the page was removed from all process and thread working sets under certain circumstances such as memory pressure. This page may have been HOT or COLD before it left its final working set(s). It won't be accessed until either it is repurposed or mapped back into a working set.

Modified: may be thought of as a standby page whose contents may need to be written to a secondary storage device (i.e., a modified page may still contain useful content).

UNMOVABLE: the page contents cannot be moved (to another physical page) because of the type of data contained or the APIs through which the physical page was allocated.

UNSCANNABLE: the page cannot have its access frequencies accurately measured. In general, UNSCANNABLE pages can be treated as UNMOVABLE and/or HOT pages as appropriate.

Various levels of LUKEWARM or other intermediate activity "heat" levels are possible to define.

For purposes of this description, the activity levels of HOT, COLD, and UNMOVABLE are generally sufficient.

A package indicates a set of CPU cores and associated memory controller(s). Any package may be labeled as:

HOT: the resources on the package, such as memory pages and CPU cores, are known or expected to be accessed frequently (e.g., a nontrivial fraction of its memory pages are HOT, or at least LUKEWARM).

COLD: the resources on the package are known or expected to be accessed infrequently (e.g., most or all of its memory pages are known to be free or COLD, and the CPU cores are unlikely to be used by the thread scheduler or interrupt controller).

UNMOVABLE: the region contains one or more UNMOVABLE pages, processes, threads, or interrupts.

For most purposes, UNMOVABLE regions can be treated as HOT regions.

Various levels of LUKEWARM or other "heat" levels are possible to define.

For purposes of this description, HOT, COLD, and UNMOVABLE are generally sufficient.

Package offlining indicates that the package is entering a limited very low-power or no-power state that has severe restrictions on allowable activity:

All associated memory pages are essentially free; all active memory pages (presumably containing useful content) on the package have been copied to other packages, copied to secondary storage, or their content has been discarded. The assumption is that all volatile content will be lost when entering this power state.

All cores are inactive; all threads/processes running on the package have been terminated, suspended, or moved to other packages. The assumption is that the thread scheduler will not be allowed to assign work to the cores on the package while in this power state.

Most or all interrupts assigned to that package have been blocked or moved to other packages. It is possible that a small number of specific interrupts can still be handled by the package while in this state, such as an interrupt to bring the package back up to an active state.

Sufficient state is saved regarding the package configuration such that it can be returned successfully to an active state and resume its duties when it is no longer desirable that the package be in a low-power or no-power state.

Package parking implies that package is entering a limited low-power state that still allows some level of functionality, such as the ability to still access the package's memory but not schedule threads onto its CPU cores.

There would typically be a performance or power penalty associated with such functionality, such as a longer latency for accessing memory on a parked package. If the memory is accessible, then page access histories can be tracked to keep the "heat" ratings of the individual pages up to date. The following conditions are maintained:

Most or all HOT memory pages on that package have been discarded, moved to other packages, or copied to secondary storage. As a result, COLD pages may have been moved to the parked package.

Threads and processes on that package have been suspended, terminated, or moved to other packages.

Either all or a subset of interrupts assigned to that package have been blocked or moved to other packages.

Sufficient state is saved (if necessary) regarding the package configuration such that it can be returned successfully to a fully active state and resume its complete set of duties when it is no longer desirable that the package be in a low-power state.

Hard affinity implies that a specific interrupt, thread, or process can run only on a specific subset of processors (its hard affinity set).

Soft affinity implies that a specific interrupt, thread, or process has a preference to run on a specific subset of processors (its soft affinity set)

The activity level "heat" classifications are based on tracking memory access rates and CPU usage. Memory accesses to pages may be traced by hardware or software, at a coarse or fine level of granularity. Similarly, CPU usage may be traced by software or hardware. The means by which the memory access rates are tracked or captured is not part of this disclosure.

Referring now to FIG. 1, a system 100 is illustrated. The system 100 of FIG. 1 is a multi-node computer server (with a single operating system (OS) image 101). In the example illustrated in FIG. 1, each of the nodes is a package, and in this example, each node is in a different power region. FIG. 1 illustrates that the system includes nodes 102-X, 102-Y, and 102-Z. Within each node (referred to generally as 102) there are multiple CPUs. For example, node 102-X includes CPUs 104-X0, 104-X1, 104-X2, and 104-X3, node 102-Y includes CPUs 104-Y0, 104-Y1, 104-Y2, and 104-Y3, and node 102-Z includes CPUs 104-Z0, 104-Z1, 104-Z2, and 104-Z3, Each node may have memory and/or I/O interconnects and devices attached. For example, node 102-X is attached to memory 106-X and I/O interconnects 108-X, node 102-Y is attached to memory 106-Y and I/O interconnects 108-Y, and node 102-Z is attached to memory 106-Z and I/O interconnects 108-Z. Note that memory and I/O devices could also be part of the system but not associated with a single node.

FIG. 2 illustrates an example of memory implemented with multiple power regions. Each node (e.g., 202-X) of a single- or multi-node computer server includes one or more CPUs 204-X0, 204-X1, 204-X2, 204-X3, and may be connected to multiple memory interconnects (e.g., 210-XM0, 210-XM1 and 210-XM2). Each memory interconnect may be connected to multiple memory devices (e.g., 206-XM0-0, 206-XM0-1, and 206-XM0-2). Within each memory device there may be multiple, possibly nested, power regions (e.g., 212-P0 and 212-P1, and nested power regions 212-P0-0, 212-P0-1, 212-P1-0, and 212-P1-1). All of the devices on a given memory interconnect may also constitute a power region. All of the memory devices on all of the memory interconnects for a given node may also constitute a power region. Power regions may also cross node boundaries.

Discovery of Primary and Secondary Power Regions

For purposes of discussion, power regions are termed as primary power regions or secondary power regions herein.

Various examples will now be described within the context of the systems 100 and 200 illustrated in FIGS. 1 and 2. The systems comprises a plurality of power regions. In FIG. 1, each of the power regions is defined by a package and associated memory and I/O interconnects In FIG. 2, the power regions are defined by a portion of memory. For example, node 102-X along with memory 106-X and 108-X may be a primary power region. Nodes 102-Y and 102-Z along with their associated memory and I/O interconnects may be secondary power regions. In FIG. 2, power region 206-XM0-0 may be a primary power region, where the other power regions are secondary power regions. While only a single primary power region is demonstrated, it should be appreciated that a system can have multiple primary power regions.

PRIMARY power regions have more restrictions on what power states they can enter. For example, this can be due to power rails being shared with other components and thus enforcing a dependency between the power region and the components' power states. For example, some memory is utilized directly by system hardware and is always accessible to the hardware. Or, it may be a requirement, for example, that CPU Core 104-X0 is always available for processing certain hardware interrupts. Depending on the implementation, it is possible that a PRIMARY power region could be parked but not offlined.

SECONDARY power regions have fewer restrictions and therefore can be put into low-power and/or no-power states when appropriate and possible (i.e., parked and/or offlined).

The system hardware provides this type of power region classification information to the OS 101 or 201 at boot time so that the OS 101 or 201 can accordingly allocate resources in a manner that allows the possibility of transitioning one or more power regions into low-power or no-power states. For example, the OS 101 or 201 allocates some UNMOVABLE resources during system boot. If the OS 101 or 201 doesn't have clear information about the PRIMARY and SECONDARY power region classifications, it may allocate an UNMOVABLE resource within a SECONDARY power region, making that region ineligible for subsequent parking/offlining and thereby limiting the amount of energy savings that can be obtained from dropping SECONDARY power regions into low-power or no-power states.

Allocation of Resources

If multiple power regions are exposed to the OS 101 or 201, resources and activities can be distributed across the power regions to improve system performance. If a system's configuration is amenable to power region parking or offlining, resource allocation can be performed keeping that possibility in mind. Resources that cannot be moved dynamically (UNMOVABLE) may be preferentially allocated from PRIMARY power regions, whereas MOVABLE resources can be allocated from either type of power region.

Allocation of Interrupts

There may be different kinds of hardware devices (e.g., keyboards, mice, network controllers, storage controllers) with different interrupt assignment and reassignment capabilities. Below are some examples of different interrupt scenarios.

In one scenario, for some devices, interrupts are assigned to a single CPU (e.g., a specific core or hyperthread) and cannot be reassigned by the OS 101 or 201 after the device is enabled, in which case the device's interrupt(s) are assigned to a CPU (e.g., CPU 104-X0) on a PRIMARY power region (e.g. the power region including node 102-X). If one or more of the device's interrupt(s) were assigned to a SECONDARY power region, that region might not be able to be parked or offlined.

In another scenario, for some devices, interrupts may be assigned to a single CPU power region, and the device interrupts CPU cores on that power region in some fashion such as round robin. The interrupts cannot be reassigned, in which case the device's interrupts are assigned to a PRIMARY power region (e.g. the power region including node 102-X). If one or more of the device's interrupts were assigned to a SECONDARY power region, that region might not be able to be parked or offlined.

In another scenario, for some devices, interrupt assignments can be reset and dynamically assigned to other CPUs and power regions. However, there may be a period of delay when a device is disabled and re-enabled, making it unavailable for use for that interval. Such a device's interrupt(s) can be assigned to either PRIMARY or SECONDARY power regions and be subsequently relocated as necessary provided that the delay period is sufficiently short to be undetected by or acceptable to any software that is sensitive to such delays. One heuristic that can be used when choosing which power region such a device's interrupt(s) are assigned to is the cost of the reassignment of interrupts. If it is costly in terms of the time of unavailability during reassignment of interrupts or other such criteria, a device's interrupt(s) can be assigned to a PRIMARY power region. Otherwise they can be assigned to a SECONDARY power region, in consideration of load-balancing at medium-high load levels.

In another scenario, for some devices, interrupts can be assigned to multiple CPUs that do not have to be on the same power region. It might be appropriate in such a scenario to assign the interrupts to CPUs on different power regions, making sure that at least one interrupt is assigned to a PRIMARY power region. Thus, for example, a single interrupt could be assigned to both node 102-X and node 102-Y.

If the system is known to spend most of the time at low-medium load levels, all interrupts can be assigned to PRIMARY power regions because in such cases most of the time the system will have some or all SECONDARY power regions in low-power or no-power states. Whereas, if system is known to spend much of the time at medium-high utilization levels, MOVABLE interrupts can be assigned to SECONDARY power regions and UNMOVABLE interrupts can be assigned to PRIMARY power regions in order to facilitate load-balancing.

Allocation or Scheduling of Processes and Threads

For purposes of power region parking or offlining, a process or thread can be allocated or scheduled anywhere (e.g., based on load-balancing criteria) as long as it can be moved on demand. An example of UNMOVABLE threads or processes are those that have been "hard affinitized" to a CPU or set of CPUs by the OS 101 or 201, possibly on behalf of an application or driver.

Allocation or scheduling of UNMOVABLE processes and threads is made to PRIMARY power regions. Note that processes and threads may transition from MOVABLE to UNMOVABLE during their lifetime, in which case they may be relocated dynamically (if possible) in order to keep all UNMOVABLE processes and threads on PRIMARY power regions. If one or more UNMOVABLE processes or threads were assigned to a SECONDARY power region, that region might not be able to be parked or offlined.

Allocation or scheduling of MOVABLE processes and threads to COLD power regions is generally avoided, as new processes and threads are likely to have immediate activity and thus "heat up" the COLD power regions, unless this is the desired outcome. This is discussed in more detail below in the discussion of workload trending.

Allocation of Memory Pages

Pages (i.e., page contents) that are UNMOVABLE are allocated from PRIMARY power regions (e.g. allocations from memory 106-X). If they are allocated from SECONDARY power regions, they could prevent those power regions from being parked or offlined. Other categories of pages can be allocated from anywhere. Pages may transition from MOVABLE to UNMOVABLE during their lifetime, in which case they may be relocated dynamically (e.g., before being converted to UNMOVABLE) in order to keep all UNMOVABLE pages on PRIMARY power regions.

Allocation of new MOVABLE pages from COLD power regions is generally avoided, as newly allocated pages are likely to have immediate activity and thus "heat up" the COLD power regions, unless this is the desired outcome.

Relocation of Resources

Relocation of Interrupts

Deactivating a Power Region

Once a power region is selected to be moved into a low-power (parked) or no-power (offlined) state, interrupts assigned to its CPUs are relocated to other power regions—especially in the case of offlining. MOVABLE Interrupts can be relocated (i.e., they can be assigned to other CPU cores or power regions). Target destination power region(s) for a particular interrupt or set of interrupts to be relocated can be chosen based on load-balancing techniques. For example, the mean interrupt rates generated for each interrupt can be tracked, thereby enabling an interrupt reassignment schedule designed such that any single power region or subset of power regions are not unfairly inundated with interrupts, resulting in unacceptable performance degradation. Alternately, interrupts can be relocated for consolidation purposes if workload trends are known. This is discussed in more detail below in the discussion of workload trending.

Additionally, based on the interrupt rate (or other statistics), interrupts can be divided in different activity categories, such as HOT and COLD. These heat characteristics, along with each power region's heat characteristics, may be used to determine an optimal target for each interrupt to be relocated. This concept of choosing a target power region for an interrupt can further be extended to choose specific CPU(s) in a power region. Again, if it is determined that a particular CPU is getting saturated or has the potential of getting saturated, that CPU can be avoided as a target for further relocated interrupts.

As noted above, some devices may have interrupts that can be assigned to multiple power regions simultaneously. This provides the lowest-cost interrupt relocation mechanism, since "relocating" interrupts may be accomplished by simply deactivating a subset of a device's interrupt targets so that only interrupts targeting active power regions remain.

Reactivating a Power Region

Similarly, when a power region is selected to be unparked/onlined, it may be desirable to relocate interrupts back to the now-available CPUs. Similar load-balancing techniques can be used to select interrupts from active power regions to relocate to the power region being reactivated. Note that embodiments may be implemented such that "thrashing" is avoided in a scenario where power regions are frequently being activated or reactivated, as there is a nonzero power and performance cost associated with relocating interrupts. Relocating interrupts too frequently could defeat the power benefits of parking/offlining.

Relocation of Processes and Threads

Deactivating a Power Region

Once a power region is selected to be moved into a low-power (parked) or no-power (offlined) state, its processes and threads are relocated to other power regions. (All of the power region's threads are assumed to be MOVABLE for this discussion, although there are possible solutions where parking might not require complete vacation of processes and threads.) Target destination power region(s) for a particular process/thread or set of processes/threads can be chosen based on load-balancing. For example, per-process and/or per-thread CPU usage can be tracked, thereby enabling a process/thread reassignment schedule designed such that any single core, power region, or subset of power regions is not unfairly inundated with thread activity, resulting in an unacceptable performance degradation. Alternately, processes and threads can be relocated for consolidation purposes if workload trends are known.

Power levels of the remaining (active) power regions can also be criteria used while deciding relocation. Depending on the level of activity on an active power region, different power levels may be required. For example, embodiments may determine power levels by examining Advance Configuration and Power Interface (ACPI) "P-States" and "C-States". This can provide information about power being used by processors and/or information about power required to bring a processor from an idle state to a usable state. Based on per-thread CPU usage predictions, the near-term CPU usage of each core and power region can be predicted. If power information for each CPU and power region for different performance and idle states is made available by platform, that information can be used to decide better resource allocation. In essence, the power management algorithms that dynamically select CPU performance and idle states can coordinate with the power management algorithms that select the target destinations for relocated processes and threads—in order to achieve better overall system energy efficiency.

Additionally, relationships between threads in terms of sharing of resources can be analyzed and used as a factor when deciding the target CPU or power region for each thread. For example, if a set of threads share a set of frequently accessed memory pages, it may be advantageous to keep all or most of the shared memory pages together with all or most of the threads sharing those pages onto one or a subset of power regions. Those threads residing on the same power region may be able to share cache resources. If the threads do not run concurrently or have low utilization requirements, they may even be able to be allocated to one or a subset of the cores on the power region.

Memory-bound threads (which do not benefit as much from cache resources) can be spread across different sockets so that memory bandwidth requirements are also spread across the available hardware.

Hard (inflexible) affinitization of processes or threads to specific sockets or CPUs poses a challenge. Some embodiments may be able to handle this case by moving the threads to other sockets or CPUs maintaining the relations. For example, if a thread A is affinitized to CPU 0 and thread B is affinitized to CPU 1 in socket 1, these threads are moved to CPU 0 and 1 respectively on socket 0. If there are many threads that are hard affinitized and it is not easy to find the relationships between threads, only memory can be offlined from the power region. Similarly, allocation of an UNMOVEABLE memory page on a socket poses a challenge. In such cases, partial offlining could be used, in which case only CPUs are offlined and memory is not. There may be a non-trivial performance penalty as a result of partial offlining. Therefore, a trade-off decision is made between performance and power.

Reactivating a Power Region

Once a power region is selected to be unparked/onlined, it may be desirable to relocate processes and threads back to the now-available CPUs. Similar load-balancing techniques can be used to select processes and threads from active power regions to relocate to the power region being reactivated. Note that some embodiments are implemented such that "thrashing" is avoided in a scenario where power regions are frequently being activated or reactivated, as there is a nonzero power and performance cost associated with relocating processes and threads. Relocating processes and threads too frequently could defeat the power benefits of parking/offlining.

Relocation of Memory Pages in Conjunction with Associated Processes and Threads

On non-uniform memory access (NUMA) enabled systems, accessing a remote socket's memory generally takes longer than accessing a local socket's memory, and hence the OS 101 or 201 tries to allocate a thread's memory pages from the socket(s) on which the thread is most likely to run. When relocating memory pages across power regions, the same semantics are considered. Groups of threads that access the same or most of the same set of memory pages can be relocated together to the same socket. For example, threads belonging to the same process often have a higher likelihood of sharing memory pages, and thus could be relocated as a group.

Modifying Interrupt, Process, Thread, and Memory Page Management Based on Workload Trending or Power Conditions By tracking short-term and/or long-term history, trends in workload behavior can be leveraged to prepare for changes in workload intensity or characteristics more quickly or even before they occur. Workload level could be monitored using multiple metrics, such as overall memory utilization as well as per-region memory utilization, or the CPU utilization of cores that have a relationship with the memory regions being monitored. CPU utilization could include average frequency (if variable-frequency clock) as well as total busy time. Memory utilization could include overall as well as per-region memory access counts or latencies. In addition, if there are power meters available for CPU and/or memory hardware, they could also provide an indication of utilization levels. Also, a number of other inputs can be taken into account such as whether system is running in power saver mode or if system is performing a latency sensitive operation, etc.

Allocation

If the workload is trending downward (i.e., toward lower levels of activity), then there may be an expectation that a power region will soon be deactivated. In such a case, it makes sense to start "cooling" down a power region. In terms of allocation, that means not allocating new resources (which are likely to be HOT) from that (preselected) power region, since they would just have to be reallocated subsequently. The selection of what power region to start cooling can take into account current or expected levels of activity, such as targeting CPUs or power regions that are getting interrupts at a low rate and/or getting threads scheduled at a low rate and/or with low numbers of HOT memory pages.

If the workload is trending upward (i.e., toward higher levels of activity), then there may be an expectation that a power region will soon be activated. In such a case, activating it sooner than it is needed could be advantageous if a burst of allocations are taking place (or expected to take place). A newly activated power region makes a good target for new allocations.

Relocation

Relocation has power and performance impacts, so excessive relocation can defeat the energy efficiency purpose of the optimization. Workload trending can be used to prevent "thrashing" in an environment where resource utilizations fluctuate.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
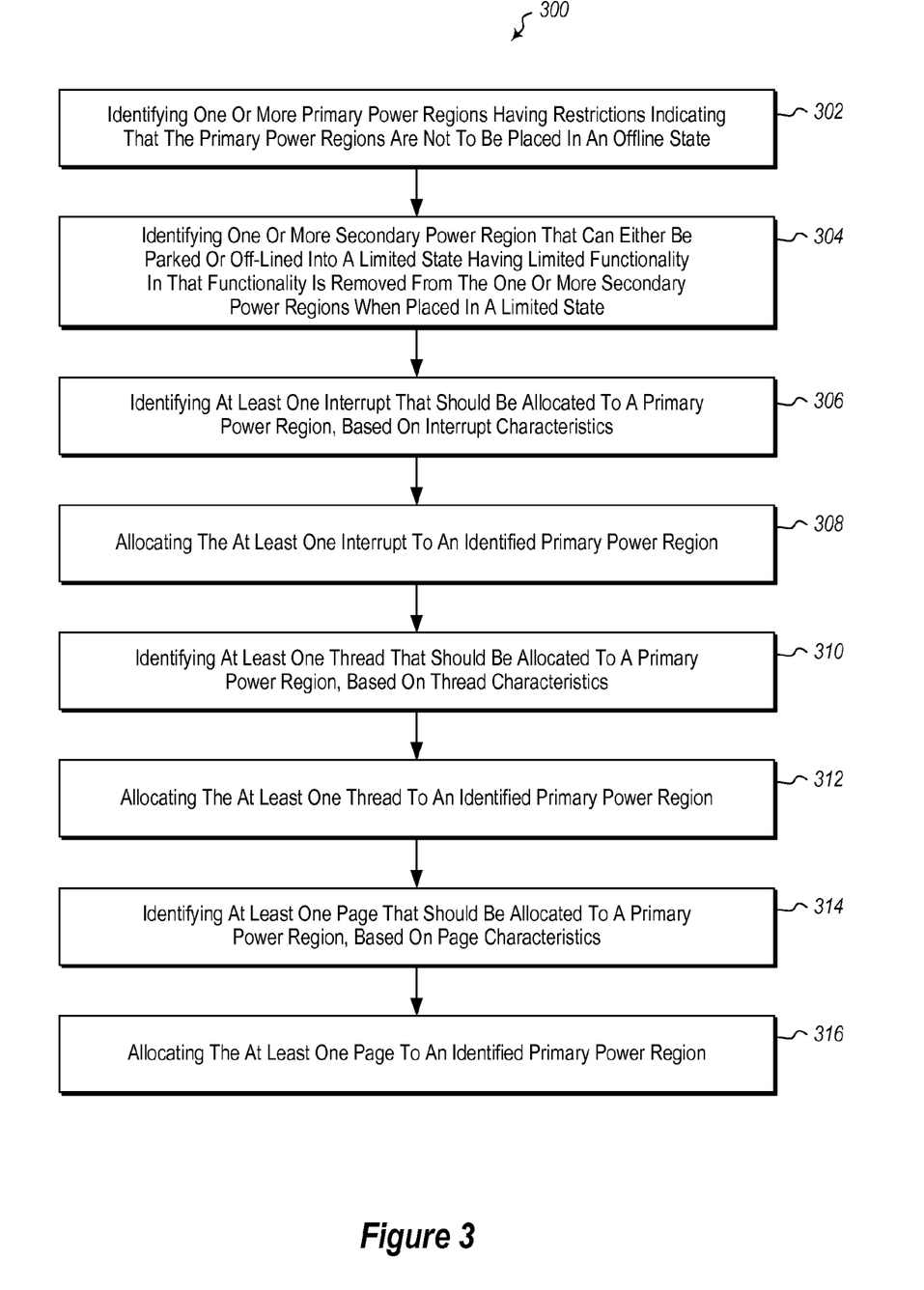
FIG. 3 illustrates a method of allocating resources to one or more power regions.

Referring now to FIG. 3, a method 300 is illustrated. The method 300 may be practiced in a computing environment. The method 300 includes acts for allocating resources to one or more power regions. The method includes identifying one or more primary power regions having restrictions indicating that the primary power regions are not to be placed in an offline state (act 302).

The method 300 further includes identifying one or more secondary power region that can either be parked or off-lined into a limited state having limited functionality in that functionality is removed from the one or more secondary power regions when placed in a limited state (act 304). Power regions with limited functionality are described above in the definitions of package offlining and package parking. It should be appreciated that while those definitions discuss packages specifically, the concepts can be applied to power regions in general.

The method 300 further includes identifying at least one interrupt that should be allocated to a primary power region, based on interrupt characteristics (act 306).

The method 300 further includes allocating the at least one interrupt to an identified primary power region (act 308).

The method 300 further includes identifying at least one thread that should be allocated to a primary power region, based on thread characteristics (act 310).

The method 300 further includes allocating the at least one thread to an identified primary power region (act 312).

The method 300 further includes identifying at least one page that should be allocated to a primary power region, based on page characteristics (act 314).

The method 300 further includes allocating the at least one page to an identified primary power region (act 316).

The method 300 may further include bringing a secondary power region back from a limited state and allocating at least one interrupt, one thread, or one page to the secondary power region brought back from a limited state.

In some embodiments, bringing a secondary power region back from a limited state comprises bringing the secondary power regions back from a limited state based on an anticipated future need for additional computing resources. An anticipated need is not certain, but rather is probable based on analysis of historical trends, resource use trajectory, identified higher resource use periods, such as those identified by manual settings, etc. For example, a secondary power region may be brought back based on a time of day, a particular day, a determination that resource usage has been increasing, etc.

The method 300 may further include moving one or more interrupt, thread, or page from a secondary power region and then moving the secondary power region to a limited state.

The method 300 may further include allocating at least one interrupt, one thread, or one page to a primary or secondary power region based on load-balancing criteria.

The method 300 may further include allocating at least one interrupt, one thread, or one page to a primary or secondary power region to group related threads or related memory.

The method 300 may further include allocating at least one interrupt, one thread, or one page to a primary power region based on the at least one interrupt, one thread, or one page changing from a MOVABLE resource to an UNMOVABLE resource.

The method 300 may further include allocating at least one interrupt, one thread, or one page to a secondary power region based on the at least one interrupt, one thread, or one page changing from an UNMOVABLE resource to a MOVABLE resource.

The method 300 may further include allocating one or more interrupts to both a primary power region and one or more secondary power regions.

The method 300 may be practiced where one or more of the power regions comprises a package.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Figure 4:
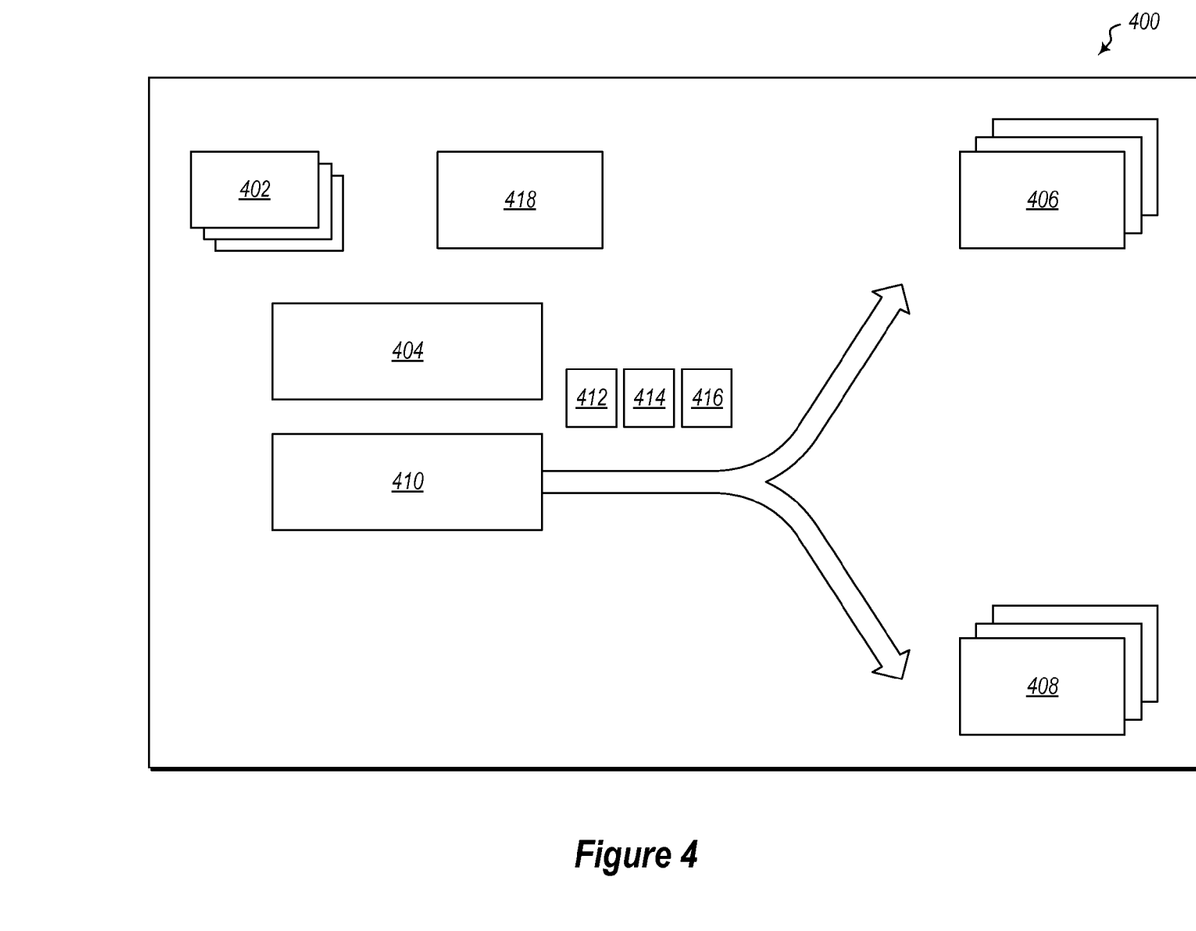
FIG. 4 illustrates a system for allocating resources to one or more power regions.

Referring now to FIG. 4, a system 400 for allocating resources to one or more power regions is illustrated. The system 400 includes one or more computer processors 402. The one or more computer processors 402 are configured to implement a power region determination module 404. The power region determination module 404 is configured to identify one or more primary power regions 406 having restrictions indicating that the primary power regions are not to be placed in an offline state and to identify one or more secondary power regions 408 that can either be parked or off-lined into a limited state having limited functionality in that functionality is removed from the one or more secondary power regions when placed in a limited state.

The system 400 further includes a resource allocation module 410. The resource allocation module is configured to: identify whether interrupts 412 should be allocated to a primary power region 406 or a secondary power region 408 based on interrupt characteristics; identify whether threads 414 should be allocated to a primary power region 406 or a secondary power region 408 based on thread characteristics; identify whether pages 416 should be allocated to a primary power region 406 or a secondary power region 408 based on page characteristics; and to allocate interrupts 412, threads 414 and pages 416 to primary 406 or secondary 408 power regions as identified.

The system 400 may further include a power region activation module 418 that is configured to bring a secondary power region 408 back from a limited state. In some embodiments, the power region activation module 418 is configured to bring a secondary power region 408 back from a limited state based on an anticipated future need for additional computing resources. In some embodiments, the resource allocation module 410 is configured to move one or more interrupts, threads, or pages from a secondary power region 408 and the power region activation module 418 is configured to move the secondary power region 408 to a limited state.

In some embodiments, the resource allocation module 410 is configured to allocate at least one interrupt, one thread, or one page to a primary 406 or secondary 408 power region based on load-balancing criteria.

In some embodiments, the resource allocation module 410 is configured to allocate at least one interrupt, one thread, or one page to a primary 406 or secondary 408 power region to group related threads or related memory.

In some embodiments, the resource allocation module 410 is configured to allocate at least one interrupt, one thread, or one page based on the at least one interrupt, one thread, or one page changing from a MOVABLE resource to an UNMOVABLE resource or from an UNMOVABLE resource to a MOVABLE resource.

In some embodiments, the resource allocation module 410 is configured to allocate one or more interrupts to both a primary power region 406 and one or more secondary power regions 408.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of allocating resources to one or more power regions, the method comprising:

identifying one or more primary power regions having restrictions indicating that the primary power regions are not to be placed in an offline state, wherein the one or more primary power regions comprise one or more processors including functionality to handle hardware interrupts, and attached memory;

identifying one or more secondary power regions that can either be parked or off-lined into a limited state having limited functionality in that functionality is removed from the one or more secondary power regions when placed in a limited state;

identifying at least one hardware device for which an interrupt for the hardware device should be assigned to a processor at a primary power region, based on hardware device characteristics;

assigning an interrupt for the at least one hardware device to a processor at an identified primary power region;

identifying at least one thread that should be allocated to a processor at a primary power region, based on thread characteristics;

allocating the at least one thread to a processor at an identified primary power region;

identifying at least one page that should be allocated to a primary power region, based on page characteristics; and allocating the at least one page to an identified primary power region.

2. The method of claim 1, further comprising bringing a secondary power region back from a limited state;

allocating at least one interrupt, one thread, or one page to a processor at the secondary power region brought back from a limited state.

3. The method of claim 2, wherein bringing a secondary power region back from a limited state comprises bringing the secondary power regions back from a limited state based on an anticipated future need for additional computing resources.

4. The method of claim 1, further comprising moving one or more interrupt, thread, or page from a processor at a secondary power region and then moving the secondary power region to a limited state.

5. The method of claim 1, further comprising allocating at least one interrupt, one thread, or one page to a processor at a primary or secondary power region based on load-balancing criteria.

6. The method of claim 1, further comprising allocating at least one interrupt, one thread, or one page to a processor at a primary or secondary power region to group related threads or related memory.

7. The method of claim 1, further comprising allocating at least one interrupt, one thread, or one page to a processor at a primary power region based on the at least one interrupt, one thread, or one page changing from a movable resource to an unmovable resource.

8. The method of claim 1, further comprising allocating at least one interrupt, one thread, or one page to a processor at a secondary power region based on the at least one interrupt, one thread, or one page changing from an unmovable resource to a movable resource.

9. The method of claim 1, further comprising allocating one or more interrupts to both a processor at a primary power region and one or more processors at one or more secondary power regions.

10. The method of claim 1, wherein one or more of the power regions comprises a package.

11. In a computing environment, a system for allocating resources to one or more power regions, the system comprising:

one or more computer processors, wherein the one or more computer processors are configured to implement:

a power region determination module, wherein the power region determination module is configured to identify one or more primary power regions having restrictions indicating that the primary power regions are not to be placed in an offline state, wherein the one or more primary power regions comprise one or more processors including functionality to handle hardware interrupts, and attached memory, and to identify one or more secondary power region that can either be parked or off-lined into a limited state having limited functionality in that functionality is removed from the one or more secondary power regions when placed in a limited state;

a resource allocation module, wherein the resource allocation module is configured to: identify whether interrupts for hardware devices should be allocated to a processor at a primary power region or a processor at a secondary power region based on hardware device characteristics; identify whether threads should be allocated to a processor at a primary power region or a processor at a secondary power region based on thread characteristics; identify whether pages should be allocated to a primary power region or a secondary power region based on page characteristics; and to allocate interrupts, threads and pages to primary or secondary power regions as identified.

12. The system of claim 11, further comprising a power region activation module that is configured to bring a secondary power region back from a limited state.

13. The system of claim 12 wherein the power region activation module is configured to bring a secondary power region back from a limited state based on an anticipated future need for additional computing resources.

14. The system of claim 12 wherein the resource allocation module is configured to move one or more interrupts, threads, or pages from a secondary power region and the power region activation module is configured to move the secondary power region to a limited state.

15. The system of claim 12 wherein the resource allocation module is configured to allocate at least one interrupt, one thread, or one page to a primary or secondary power region based on load-balancing criteria.

16. The system of claim 12 wherein the resource allocation module is configured to allocate at least one interrupt, one thread, or one page to a primary or secondary power region to group related threads or related memory.

17. The system of claim 12 wherein the resource allocation module is configured to allocate at least one interrupt, one thread, or one page based on the at least one interrupt, one thread, or one page changing from a movable resource to an unmovable resource or from an unmovable resource to a movable resource.

18. The system of claim 12 wherein the resource allocation module is configured to allocate one or more interrupts to both processors at a primary power region and one or more secondary power regions.

19. In a computing environment, a system comprising:

one or more computer processors coupled to one or more computer readable media, wherein the one or more computer processors and computer readable media are configured to implement:

one or more primary power regions having restrictions indicating that the primary power regions are not to be placed in an offline state, wherein the one or more primary power regions comprise one or more processors including functionality to handle hardware interrupts, and attached memory;

one or more secondary power regions that can either be parked or off-lined into a limited state having limited functionality in that functionality is removed from the one or more secondary power regions when placed in a limited state;

at least one hardware device interrupt allocated to a processor at one of the primary power regions, based on hardware device interrupt characteristics;

at least one thread allocated to a processor at one of the primary power regions, based on thread characteristics; and at least one page allocated to one of the primary power regions, based on page characteristics.

20. The system of claim 19, wherein one or more of the power regions comprises a package.

* * * * *